United States Patent
Anderson

(10) Patent No.: US 10,466,720 B2
(45) Date of Patent: Nov. 5, 2019

(54) PROVIDING DIAGNOSTIC AND/OR PROGNOSTIC CAPABILITIES IN A PROCESS CONTROL SYSTEM

(71) Applicant: FISHER CONTROLS INTERNATIONAL LLC, Marshalltown, IA (US)

(72) Inventor: Shawn W. Anderson, Haverhill, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 1042 days.

(21) Appl. No.: 13/963,590

(22) Filed: Aug. 9, 2013

(65) Prior Publication Data
US 2015/0045970 A1    Feb. 12, 2015

(51) Int. Cl.
*G05D 7/06* (2006.01)
*F16K 37/00* (2006.01)
*G05B 23/02* (2006.01)

(52) U.S. Cl.
CPC ....... *G05D 7/0617* (2013.01); *F16K 37/0083* (2013.01); *G05B 23/0283* (2013.01)

(58) Field of Classification Search
None
See application file for complete search history.

(56) References Cited

U.S. PATENT DOCUMENTS

| | | | | |
|---|---|---|---|---|
| 4,546,442 A | * | 10/1985 | Tinker | B01D 53/0454 700/266 |
| 2009/0256090 A1 | * | 10/2009 | Affaticati | F16K 37/0041 251/129.04 |
| 2010/0070240 A1 | | 3/2010 | Yasuda et al. | |
| 2010/0147395 A1 | | 6/2010 | Meier et al. | |

(Continued)

FOREIGN PATENT DOCUMENTS

CN    204360211    5/2015

OTHER PUBLICATIONS

International Search Report and Written Opinion from International Application No. PCT/US2014/049665, dated Nov. 13, 2014.

(Continued)

*Primary Examiner* — Mohammad Ali
*Assistant Examiner* — Saad M Kabir
(74) *Attorney, Agent, or Firm* — Marshall, Gerstein & Borun LLP

(57) ABSTRACT

A process control device that includes a process control valve, an actuator, a digital valve controller ("DVC"), and a processor. The actuator is coupled to the process control valve and is configured to control a position of the process control valve. The DVC is communicatively coupled to the process control valve and the actuator. The DVC is configured to obtain first data and second data, the first data associated with a fluid flow through the actuator or the DVC at a first point in time, and the second data associated with the fluid flow through the actuator or the DVC at a second point in time different from the first point in time. The (Continued)

processor is configured to aggregate the first data and the second data, and perform diagnostic and/or prognostic techniques based on the aggregated data.

19 Claims, 4 Drawing Sheets

(56) References Cited

U.S. PATENT DOCUMENTS

| | | | |
|---|---|---|---|
| 2010/0256784 A1* | 10/2010 | Seberger | G05B 19/44 700/33 |
| 2012/0061233 A1* | 3/2012 | Taylor | F01N 1/02 204/164 |

OTHER PUBLICATIONS

Office Action received in CN 201410377539.9, dated Dec. 27, 2017.
Office Action received in EP 14752981.2, dated Nov. 3, 2017.
Examination Report received in GC 2014-27692, dated May 30, 2017.
Examination Report received in GC 2014-27692, dated Jan. 28, 2018.
Second Office Action received in Chinese Application No. 201410377539.9, dated Jul. 30, 2018.
Office Action received in RU 2016107167/06 dated Jun. 1, 2018.

* cited by examiner

PROVIDING DIAGNOSTIC AND/OR PROGNOSTIC CAPABILITIES IN A PROCESS CONTROL SYSTEM

FIELD OF THE DISCLOSURE

The present disclosure is directed to process control systems and, more particularly, providing diagnostic and/or prognostic capabilities in a process control system.

BACKGROUND

Process control systems, such as distributed or scalable process control systems like those used in chemical, petroleum or other processes, typically include one or more process controllers communicatively coupled to one or more field devices via analog, digital, or combined analog/digital buses. The field devices, which may include, for example, control valve assemblies (e.g., control valves, actuators, valve controllers), valve positioners, switches, and transmitters (e.g., temperature, pressure and flow rate sensors), perform functions within the process such as opening or closing valves, measuring process parameters, and performing basic diagnostics (e.g., valve controllers may estimate the real time mass of fluid flowing through the process for the purpose of detecting leaks). The process controller receives signals indicative of process measurements made by the field devices and/or other information pertaining to the field devices, and uses this information to execute or implement one or more control routines to generate control signals, which are sent over the buses to the field devices to control the operation of the process. Information from each of the field devices and the controller is typically made available to one or more applications executed by one or more other hardware devices, such as host or user workstations, personal computers or computing devices, to enable an operator to perform any desired function regarding the process, such as setting parameters for the process, viewing the current state of the process, modifying the operation of the process, etc.

SUMMARY

One aspect of the present disclosure includes a process control device. The process control device includes a process control valve, an actuator, and a digital valve controller. The actuator is coupled to the process control valve and is configured to control a position of the process control valve by controlling the pressure of a pressurized fluid utility medium. The digital valve controller is communicatively coupled to the process control valve and the actuator. The digital valve controller is configured to obtain first data and second data, the first data associated with a fluid flow through the actuator or the digital valve controller at a first point in time, and the second data associated with the fluid flow through the actuator or the digital valve controller at a second point in time different from the first point in time. A processor is arranged to aggregate the first data and the second data, and perform one or more diagnostic and/or prognostic techniques. The one or more diagnostic and/or prognostic techniques may, for example, include estimating a state of one or more components of the process control device.

DETAILED DESCRIPTION

Over time, high levels of fluid flow and high levels of pollutants, particulates, and moisture in a fluid flow can damage and/or reduce the effectiveness of a process control device. For example, when pollutants and/or a significant mass or volume of fluid flow through one or more components of the process control device, the pollutants and/or significant masses or volumes of fluid contact, and may crack or otherwise damage, those components, particularly elastomeric components in the process control device. These types of fluid flow can shorten the lifespan and/or hinder the performance of components in the process control device. Likewise, particulates (e.g., dust, minerals) in or with the fluid flowing through the process control device can erode or abrade adjacent surfaces, particularly adjacent surfaces manufactured from "soft" materials like aluminum, brass, rubber, etc. This erosion can, in turn, significantly reduce the lifespan of components that include these surfaces. Moreover, fluid that includes particulates and/or significant moisture may, over time, deposit these particulates and/or other materials on, in, or adjacent to critical flow components such as nozzles, ports, relays, other accessories, thereby inhibiting the flow adjacent or through these components.

To reduce these undesirable effects, the present disclosure is directed to obtaining and aggregating data associated with fluid flowing through a process control device. The present disclosure is directed to providing, based on the obtained and/or aggregated data, diagnostic and/or prognostic capabilities in connection with one or more components of a process control device that are directly exposed to or otherwise affected by fluid flow through the process control device, and, as such, are susceptible to the damage described above. The diagnostic capabilities provided by the present disclosure may, for example, facilitate quick and easy monitoring and/or troubleshooting of these components. The prognostic capabilities provided by the present disclosure may, for example, facilitate the calculation or estimation of future performance.

Figure 1:
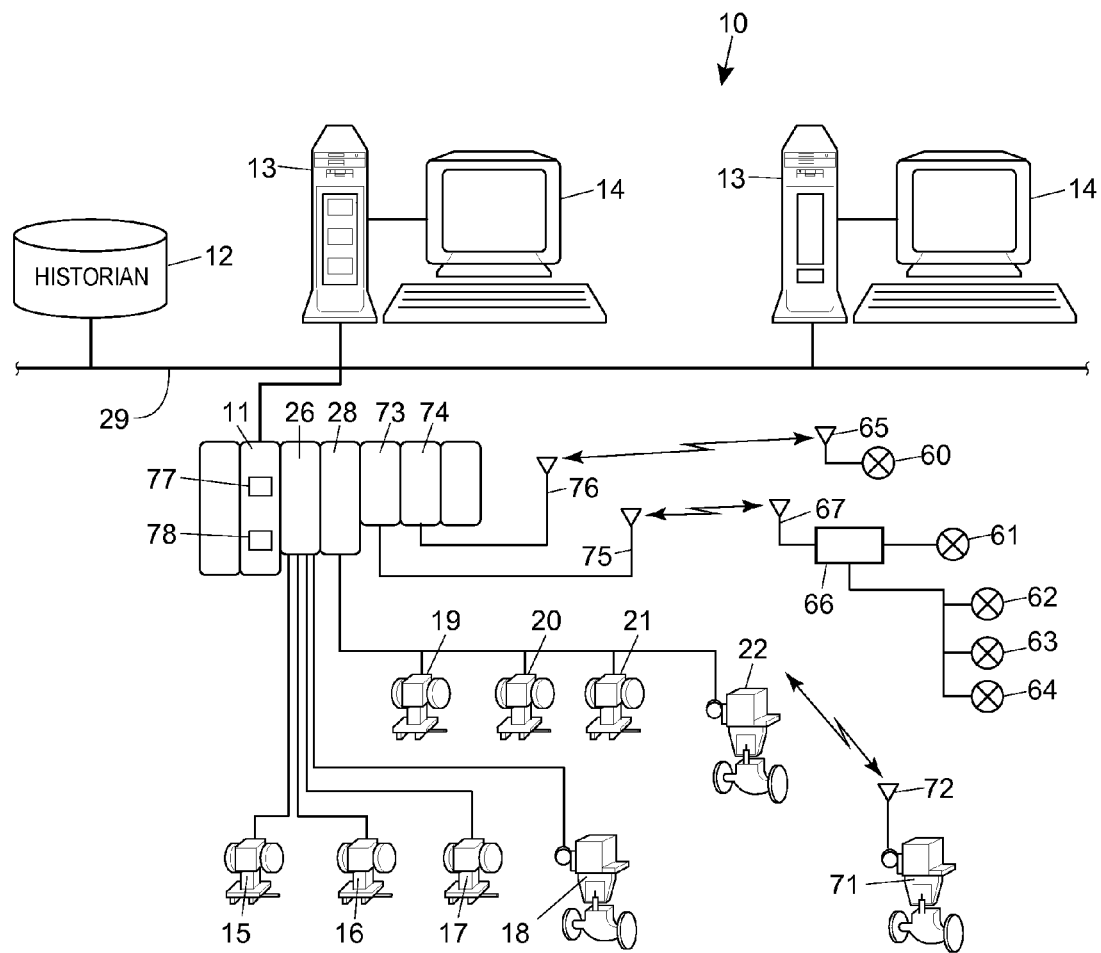
FIG. 1 is a schematic representation of a process control system having one or more field devices constructed in accordance with the principles of the present disclosure.

Referring now to FIG. 1, a process control system 10 constructed in accordance with one version of the present disclosure is depicted incorporating one or more field devices 15, 16, 17, 18, 19, 20, 21, 22, and 71 in communication with a process controller 11, which in turn, is in communication with a data historian 12 and one or more user workstations 13, each having a display screen 14. So configured, the controller 11 delivers signals to and receives signals from the field devices 15, 16, 17, 18, 19, 20, 21, 22, and 71 and the workstations 13 to control the process control system.

In additional detail, the process controller 11 of the process control system 10 of the version depicted in FIG. 1 is connected via hardwired communication connections to field devices 15, 16, 17, 18, 19, 20, 21, and 22 via input/output (I/O) cards 26 and 28. The data historian 12 may be any desired type of data collection unit having any desired type of memory and any desired or known software, hardware or firmware for storing data. Moreover, while the data historian 12 is illustrated as a separate device in FIG. 1, it may instead or in addition be part of one of the workstations 13 or another computer device, such as a server. The controller 11, which may be, by way of example, a DeltaV™ controller sold by Emerson Process Management, is communicatively connected to the workstations 13 and to the data historian 12 via a communication network 29 which may be, for example, an Ethernet connection.

As mentioned, the controller 11 is illustrated as being communicatively connected to the field devices 15, 16, 17, 18, 19, 20, 21, and 22 using a hardwired communication scheme which may include the use of any desired hardware, software and/or firmware to implement hardwired communications, including, for example, standard 4-20 mA communications, and/or any communications using any smart communication protocol such as the FOUNDATION® Fieldbus communication protocol, the HART® communication protocol, etc. The field devices 15, 16, 17, 18, 19, 20, 21, and 22 may be any types of devices, such as sensors, control valve assemblies, transmitters, positioners, etc., while the I/O cards 26 and 28 may be any types of I/O devices conforming to any desired communication or controller protocol. In the embodiment illustrated in FIG. 1, the field devices 15, 16, 17, 18 are standard 4-20 mA devices that communicate over analog lines to the I/O card 26, while the digital field devices 19, 20, 21, 22 can be smart devices, such as HART® communicating devices and Fieldbus field devices, that communicate over a digital bus to the I/O card 28 using Fieldbus protocol communications. Of course, the field devices 15, 16, 17, 18, 19, 20, 21, and 22 may conform to any other desired standard(s) or protocols, including any standards or protocols developed in the future.

In addition, the process control system 10 depicted in FIG. 1 includes a number of wireless field devices 60, 61, 62, 63, 64 and 71 disposed in the plant to be controlled. The field devices 60, 61, 62, 63, 64 are depicted as transmitters (e.g., process variable sensors) while the field device 71 is depicted as a control valve assembly including, for example, a control valve and an actuator. Wireless communications may be established between the controller 11 and the field devices 60, 61, 62, 63, 64 and 71 using any desired wireless communication equipment, including hardware, software, firmware, or any combination thereof now known or later developed. In the version illustrated in FIG. 1, an antenna 65 is coupled to and is dedicated to perform wireless communications for the transmitter 60, while a wireless router or other module 66 having an antenna 67 is coupled to collectively handle wireless communications for the transmitters 61, 62, 63, and 64. Likewise, an antenna 72 is coupled to the control valve assembly 71 to perform wireless communications for the control valve assembly 71. The field devices or associated hardware 60, 61, 62, 63, 64, 66 and 71 may implement protocol stack operations used by an appropriate wireless communication protocol to receive, decode, route, encode and send wireless signals via the antennas 65, 67 and 72 to implement wireless communications between the process controller 11 and the transmitters 60, 61, 62, 63, 64 and the control valve assembly 71.

If desired, the transmitters 60, 61, 62, 63, 64 can constitute the sole link between various process sensors (transmitters) and the process controller 11 and, as such, are relied upon to send accurate signals to the controller 11 to ensure that process performance is not compromised. The transmitters 60, 61, 62, 63, 64, often referred to as process variable transmitters (PVTs), therefore may play a significant role in the control of the overall control process.

Additionally, the control valve assembly 71 may provide measurements made by sensors within the control valve assembly 71 or may provide other data generated by or computed by the control valve assembly 71 to the controller 11 as part of its operation. Of course, as is known, the control valve assembly 71 may also receive control signals from the controller 11 to effect physical parameters, e.g., flow, within the overall process.

The process controller 11 is coupled to one or more I/O devices 73 and 74, each connected to a respective antenna 75 and 76, and these I/O devices and antennas 73, 74, 75, 76 operate as transmitters/receivers to perform wireless communications with the wireless field devices 61, 62, 63, 64 and 71 via one or more wireless communication networks. The wireless communications between the field devices (e.g., the transmitters 60, 61, 62, 63, 64 and the control valve assembly 71) may be performed using one or more known wireless communication protocols, such as the WirelessHART® protocol, the Ember protocol, a WiFi protocol, an IEEE wireless standard, etc. Still further, the I/O devices 73 and 74 may implement protocol stack operations used by these communication protocols to receive, decode, route, encode and send wireless signals via the antennas 75 and 76 to implement wireless communications between the controller 11 and the transmitters 60, 61, 62, 63, 64 and the control valve assembly 71.

As illustrated in FIG. 1, the controller 11 conventionally includes a processor 77 that implements or oversees one or more process control routines (or any module, block, or sub-routine thereof) stored in a memory 78. The process control routines stored in the memory 78 may include or be associated with control loops being implemented within the process plant. Generally speaking, and as is generally known, the process controller 11 executes one or more control routines and communicates with the field devices 15, 16, 17, 18, 19, 20, 21, 22, 60, 61, 62, 63, 64, and 71, the user workstations 13 and the data historian 12 to control a process in any desired manner(s). Additionally, any one of the field devices 18, 22, and 71 in FIG. 1, each of which is depicted as a control valve assembly, can include an intelligent digital valve controller constructed in accordance with the principles of the present disclosure for communicating with the process controller 11 in order to facilitate monitoring and/or estimation of the health, integrity, and effectiveness of the components of the control valve assembly (e.g., the actuator diaphragm).

Figure 2:
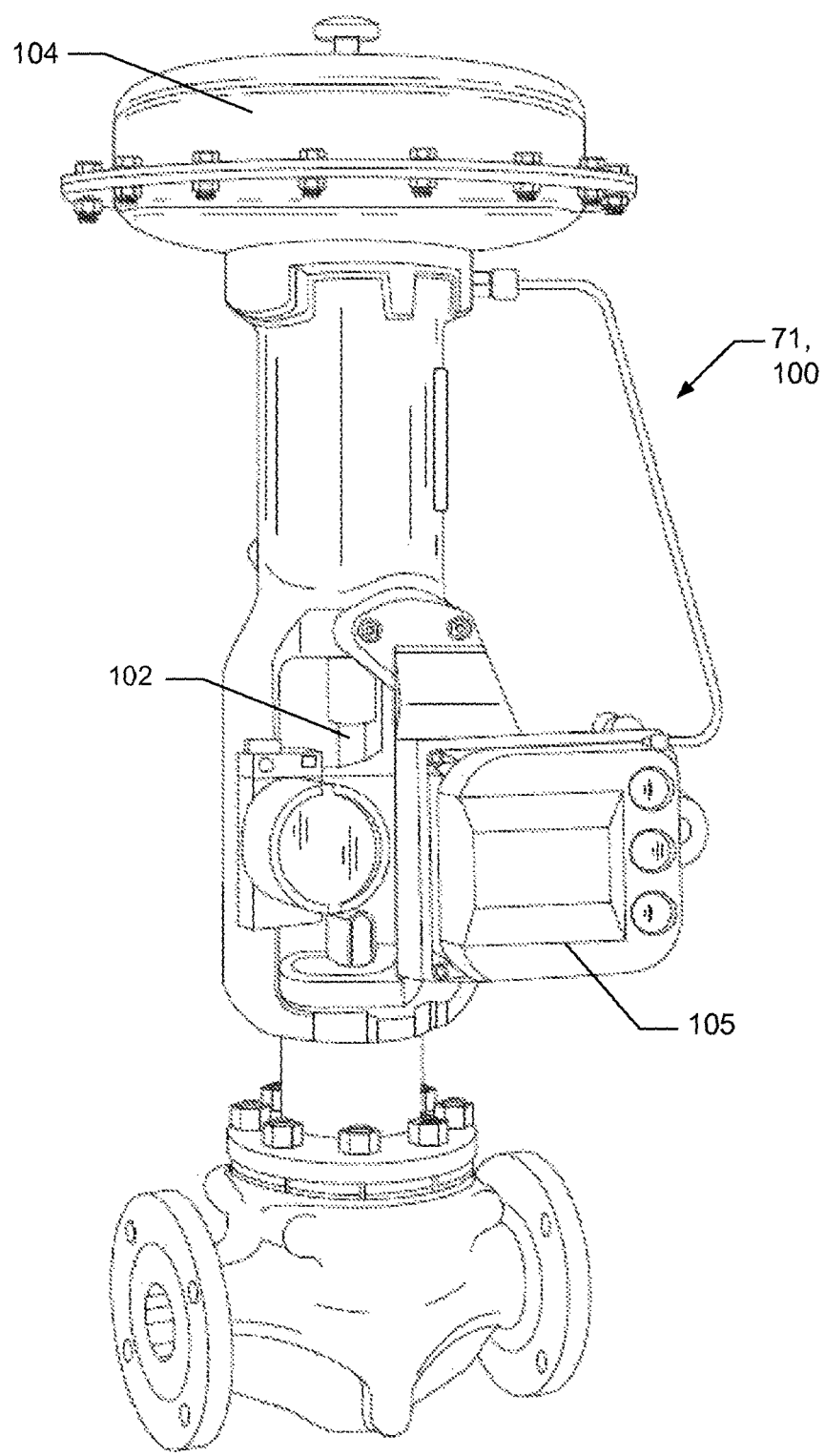
FIG. 2 depicts one example of a field device constructed in accordance with the principles of the present disclosure.

Referring now to FIG. 2, for the sake of description, the field device 71 from FIG. 1 is shown as a process control device 100 constructed in accordance with the present disclosure. In this example, the process control device 100 is a control valve assembly that includes a control valve 102, an actuator 104, and a digital valve controller 105 communicatively coupled to the control valve 102, and the actuator 104. As shown in FIG. 2, the digital valve controller 105 is physically coupled (e.g., mounted) to the control valve 102 and the actuator 104, but it need not be (e.g., it can be remotely located from the control valve 102 and the actuator 104). In other examples, the process control device 100 can be a different type of process control device and/or can include different and/or additional components.

Figure 3:
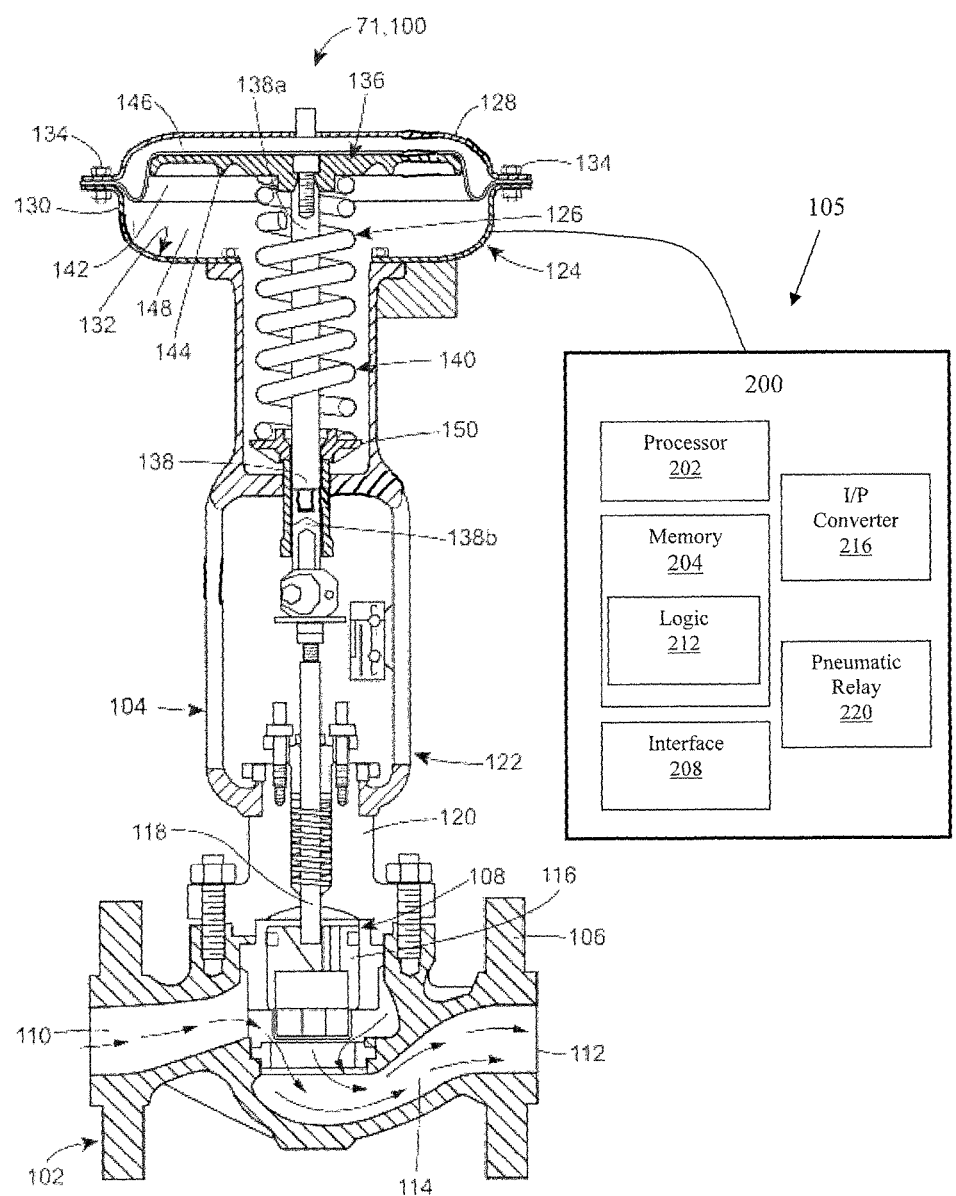
FIG. 3 is a cross-sectional view of the control valve, the actuator, and the digital valve controller of the field device of FIG. 2.

With reference to FIG. 3, further details of the control valve 102, the actuator 104, and the digital valve controller 105 will now be described. The control valve 102 is a sliding stem type control valve (e.g., a Fisher® ED valve) that includes a globe-style valve body 106 and a control element 108 disposed for displacement in the valve body 106 for controlling the flow of fluid therethrough. The fluid may be a gas (e.g., air, natural gas) or a liquid (e.g., water, liquefied natural gas). The valve body 106 defines an inlet 110, an outlet 112, and a fluid flow path 114 extending between the inlet 110 and the outlet 112. The control element 108 includes a valve plug 116 connected to a valve stem 118. The valve stem 118 extends out of the valve body 108 through a bonnet 120 for being coupled to the actuator 104 such that the actuator 104 can adjust the position of the control element 108 and, more particularly, the position of the valve plug 116 relative to the flow path 114 to adjust the flow of fluid through the control valve 102.

In other examples, the control valve 102 can be a different type of control valve, such as, for example, a rotary control valve (e.g., a Fisher® Vee-Ball™ V150 valve, a Fisher® Vee-Ball™ V300 valve, etc.), a throttle valve, an isolation valve, or other control valve. Moreover, the components of the control valve 102 (e.g., the valve body 106, the control element 108, and the bonnet 120) can vary from what is depicted herein. For example, the inlet 110, the outlet 112, and the fluid flow path 114 extending therebetween can vary in shape and/or size and yet still perform the intended functionality.

As shown in FIG. 3, the actuator 104 is a pneumatic sliding stem type actuator (e.g., a Fisher® 667 Actuator). The actuator 104 includes an actuator body 122, an actuator casing 124, and a positioning assembly 126. The actuator body 122 is a generally hollow construct providing guidance, support, and protection to at least a portion of the positioning assembly 126, as shown. The actuator casing 124 includes upper and lower diaphragm casing components 128, 130 fastened together with a plurality of fasteners 134 to define an internal actuator cavity 132. The positioning assembly 126 includes a diaphragm assembly 136, an actuator rod 138, and a biasing device 140. The diaphragm assembly 136 is disposed in the actuator cavity 132 and includes a diaphragm 142 and a diaphragm plate 144. The diaphragm plate 144 is a generally rigid disc-shaped member and the diaphragm 142 includes a conventional membrane-type diaphragm, a central portion of which is in engagement with the diaphragm plate 144. The diaphragm 142 also includes a peripheral portion secured between the upper and lower diaphragm casing components 128, 130 such that the diaphragm 142 divides the actuator cavity 132 into upper and lower sealed cavity portions 146, 148. The actuator rod 138 includes a first end 138a fixed to the diaphragm plate 144 and a second end 138b operably coupled to the valve stem 118 of the control valve 102 via a coupling yoke or some other suitable joint. Finally, the biasing device 140 of the actuator 104 depicted in FIG. 3 includes a compression coil spring disposed between the diaphragm assembly 136 and a spring seat 150 carried by the actuator body 122 at a location below the diaphragm assembly 136. So configured, the biasing device 140 naturally biases the diaphragm assembly 136 in an upward direction relative to the orientation of the actuator 104 in FIG. 3 and away from the spring seat 150. In another configuration, a similar actuator could have this motion reversed when the biasing device tends to hold the valve closed and the pneumatic signal causes the diaphragm assembly to move toward opening the valve trim.

Alternatively, the actuator 104 can be a different type of actuator, such as, for example, a rotary actuator, a piston actuator, an on-off actuator, a rack-and-pinion style actuator, and/or an electric or hydraulic actuator. The components of the actuator 104 can also vary from what is depicted herein. For example, the actuator body 122, the actuator casing 124, or the positioning assembly 126 can vary in size and/or shape and yet still perform the intended functionality.

The digital valve controller ("DVC") 105 depicted in FIG. 3 is a Fisher® FIELDVUE™ DVC 6200 Digital Valve Controller. In other examples, the digital valve controller 105 can be a Fisher® FIELDVUE™ DVC 6000 Digital Valve Controller or another type of Digital Valve Controller (e.g., a Digital Valve Controller manufactured by Fisher or by another company). The digital valve controller 105 is, as noted above, communicatively coupled to the valve 102 and the actuator 104. Although not explicitly depicted herein, the digital valve controller 105 can also be communicatively coupled to the process controller 11 described above.

The digital valve controller 105 has a module base 200. As shown in FIG. 3, the digital valve controller 105 includes a processor 202, a memory 204, a communications interface 208, computing logic 212, a I/P converter 216, and a pneumatic relay 220 disposed within the module base 200. Though not depicted herein, these components are arranged in a known manner, but can be arranged in any manner. One of ordinary skill in the art will appreciate that the digital valve controller 105 can also include additional components, such as, for example, analog-digital converters, digital-analog converters, amplifiers, and gauges, which are not explicitly depicted herein.

The processor 202 may be a general processor, a digital signal processor, ASIC, field programmable gate array, graphics processing unit, analog circuit, digital circuit, or any other known or later developed processor. The processor 202 operates pursuant to instructions in the memory 204. The memory 204 may be a volatile memory or a non-volatile memory. The memory 204 may include one or more of a read-only memory (ROM), random-access memory (RAM), a flash memory, an electronic erasable program read-only memory (EEPROM), or other type of memory. The memory 204 may include an optical, magnetic (hard drive), or any other form of data storage device.

The communications interface 208, which may be, for example, a HART® interface, a FOUNDATION™ fieldbus interface, a PROFIBUS® interface, or some other port or interface, is provided to enable or facilitate electronic communication between the digital valve controller 105 and the process controller 11 and between the digital valve controller 105 and other components of the process control device (e.g., the valve 102 and the actuator 104). This electronic communication may occur via any known communication protocol, such as, for example, the HART® communication protocol, the FOUNDATION™ fieldbus communication protocol, the PROFIBUS® communication protocol, or any other suitable communication protocol.

The logic 212 includes one or more routines and/or one or more sub-routines, embodied as computer-readable instructions stored on the memory 204. The digital valve controller 105, particularly the processor 202 thereof, can execute the logic 212 to cause the processor 202 to perform actions related to the operation (e.g., control, adjustment), maintenance, diagnosis, and/or troubleshooting of the control valve assembly 100 (e.g., the control valve 102, the actuator 104, and/or the components thereof), as will be described in greater detail below.

With the process control device 100 configured as described, the diaphragm-based actuator 104 serves to position the valve plug 116 of the control valve 102 relative to the flow path 114 to satisfy desired process control parameters (e.g., a desired set-point pressure). For example, as mentioned, the biasing device 140 of the actuator 104 naturally biases the diaphragm assembly 136 upward relative to the orientation of FIG. 2, which translates into an upward movement of the control element 108 of the control valve 102 toward an open position. In order to move the control element 108 down toward a closed position, the process controller 11 can transmit a drive signal to the processor 202 of the digital valve controller 105. The drive signal is a 4-20 mA signal, but, in other examples, can be a 0-5 VDC signal, digital communications signal, or other type of signal. The I/P converter 216, which is fluidly coupled to a supply pressure source (e.g., a pressurized air source), can convert the drive signal to a pressure signal using the pressurized fluid (e.g., pressurized air, hydraulic fluid, etc.) from the pressure supply source. The I/P converter 216 is configured to send the pressure signal to the pneumatic relay or switch 220. The pneumatic relay 220 converts the pressure signal to a pneumatic signal, which is, in turn, supplied by the processor 202 to the upper cavity portion 146 of the actuator cavity 132 to increase the pressure in the upper cavity portion 146. This increase in pressure is sensed by the diaphragm 142 and ultimately overcomes the force applied by the biasing device 140, thereby moving the diaphragm assembly 136, actuator rod 138, and control element 108 in the downward direction. When the pneumatic signal supplied to the upper cavity portion 146 is reduced and/or eliminated, the biasing device 140 can expand and urge the diaphragm assembly 136, actuator rod 138, and control element 108 upward relative to the orientation of FIG. 3.

The logic 212 may, when executed, cause the processor 202 to obtain data associated with and indicative of the operation of the process control device 100. The data associated with the process control device 100 generally includes data associated with or relevant to the fluid flowing through one or more components of the process control device 100, such as, for example, the actuator 104 and/or the digital valve controller 105.

The processor 202 may obtain data indicative of characteristics or properties of the fluid flowing through the digital valve controller 105 at one point in time (e.g., a current time, a previous time). The processor 202 may, for example, obtain data indicative of a mass of fluid flowing through the digital valve controller 105 and/or indicative of a volume of fluid flowing through the digital valve controller 105 at the one point in time. For example, the data may be or include the position of the pneumatic relay 220, data measured or collected by one or more sensors disposed within the digital valve controller 105, or other data. The data may be automatically transmitted to the processor 202 (i.e., automatically obtained by the processor 202) and/or obtained in response to a request transmitted by the processor 202. In any event, based on this data, the processor 202 can determine the relevant characteristics or properties of the fluid flowing through the digital valve controller 105 at the one point in time, such as, for example, the mass and/or volume of fluid flowing through the digital valve controller 105 at the one point in time.

Alternatively or additionally, the processor 202 may obtain data indicative of the fluid quality of the fluid flowing through the actuator 104 and/or the digital valve controller 105 at one point in time. The data indicative of the fluid quality may, for example, include (i) data indicative of the pollutant content (e.g., Ozone, $SO_x$, $NO_x$, $H_2S$, or other pollutant) of the fluid due to, for example, the environment or proximity of the process control device 100 to an electric motor, (ii) data indicative of the particulate content in the fluid, (iii) data indicative of the moisture content in the fluid, (iv) other data, or combinations thereof.

The data indicative of the fluid quality is received from a user (e.g., a user of the process control device 100). The user may provide the fluid quality data directly via the digital valve controller 105 or via the process controller 11 or a user device in communication with the digital valve controller 105. The fluid quality data may be collected or measured by one or more sensors, such as a pollutant sensor configured to detect the pollutant content of the fluid, a particulate sensor configured to detect or sense particulates (e.g., dust) in the fluid, a moisture sensor configured to detect or sense a level or amount of moisture present in the fluid, one or more sensors, or combinations thereof, arranged or disposed within or near the process control system 10 (e.g., the process control device 100). As an example, the user may enter the data indicative of the fluid quality, measured by the one or more sensors, via one of the workstations 13, and, in turn, the controller 11 may transmit the data to the processor 202. In other examples, the processor 202 may obtain some or all of this data directly from the one or more sensors, the actuator 104, the digital valve controller 105, some other component, or combinations thereof.

In addition to obtaining data measured at one-point in time, the logic 212 may, when executed, cause the processor 202 to gather or collect data over a period of time (e.g., one week, one month, etc.). This generally involves obtaining the data associated with the process control device 100 measured or collected, as described above, at two or more different points in time as described above. The obtained data may be measured at pre-determined intervals (e.g., every 5 seconds), such that the two or more different points in time are separated by the pre-determined intervals. Once obtained, the data may be stored in the memory 204 or in another memory.

In turn, the processor 202 may aggregate, accumulate, or sum some or all of the obtained data. In some embodiments, the processor 202 may aggregate only the mass or volume data. In other embodiments, the processor 202 may aggregate the mass data, the volume data, and the fluid quality data. The data may be summed by or using a summation algorithm, such as, for example a Kahan algorithm, a Bresenham algorithm, a pairwise algorithm, a Fast Fourier Transform algorithm, or the like. For example, the processor 202 may obtain, from the pneumatic relay 220, data indicative of the measured mass of the fluid flowing through the digital valve controller 105 at three different points in time, determine the mass flowing through the digital valve controller 105 at the three different points in time, and, in turn, utilize the summation algorithm to total or sum the mass data from the three different points in time and produce the total mass of fluid consumed over the three points in time. The data may be aggregated in response to (i.e., immediately following) obtaining the data or at a later time. The aggregated data may be stored in the memory 204 or in another memory.

The accumulation of the data may, in turn, produce or yield the total mass and/or volume of fluid that has/have passed through the digital valve controller 105 over the period of time, the total amount or level of pollutants and/or particulates (in the fluid) that have passed through the actuator 104 and/or the digital valve controller 105 over the period of time, the total amount or level of moisture present in the fluid that has passed through the actuator 104 and/or the digital valve controller 105 over the period of time, or combinations thereof. The accumulation may also yield or identify patterns in the data, such as, for example, increases or decreases in the volume of fluid flowing through the digital valve controller 105 (this might, for example, be due to leaks in the process control device 100), as will be described in greater detail below One or more diagnostic and/or prognostic techniques may be performed based on or using the obtained and/or aggregated data. The diagnostic and/or prognostic techniques are generally performed in connection with one or more components of the process control device 100 that are directly exposed to or otherwise affected by fluid flowing through the process control device 100 and, thus, susceptible to the damage described above. In other words, the diagnostic and/or prognostic techniques focus on one or more components of the process control device 100 that are directly exposed to or otherwise affected by fluid (and pollutants, particulates, and moisture therein) flowing through the process control device 100, and, as such, are susceptible to the types of damage noted above. Such components may, for example, include the diaphragm 142 of the actuator 104, the I/P converter 216 of the digital valve controller 105, the pneumatic relay 220 of the digital valve controller 105, one or more sensors or transducers, other components, or combinations thereof.

The techniques may, for example, include monitoring total flow, particulate, pollutant, and/or moisture values (e.g., levels or amounts) over time. For example, the total mass of fluid flowing through the digital valve controller 105 may be monitored. As another example, the total amount of particulates passing through the pneumatic relay 220 of the digital valve controller 105 over a period of time may be monitored. The diagnostic techniques may, as another example, include analyzing trends or patterns in flow, particulate, pollutant, and/or moisture values. Changes in the mass and/or volume of the fluid flow through the respective components may, in some cases, be indicative of problems or issues in the process control device 100. For example, dramatic increases in the mass and/or volume of the fluid flow through the digital valve controller 105 may be indicative of a leak in the process control device 100. Other diagnostic techniques may also or alternatively be performed. Any number of statistical analyses may be performed on or using the total data. For example, the mean level of particulates may be calculated over a period of time. In other examples, the median, standard deviation, root mean square, or the like may be calculated or determined using the total data. Other statistical techniques, such as, for example, multivariate statistical techniques, may also be performed on or using the total data.

The techniques may, for example, include assessing a state of one or more components (e.g., the diaphragm 142). The state may be a current state of the one or more components, such as the current health, integrity, and/or effectiveness of the one or more components. Alternatively or additionally, the state may be a future state of the one or more components, such as an estimated or predicted health, integrity, and/or effectiveness of the one or more components. For example, the estimated remaining lifespan of the diaphragm 142 may be assessed. In general, when higher levels of pollutants, particulates, and/or moisture have passed through one of the components, the more likely it will be that the respective component has suffered damage and is, as a result, not as healthy and/or will not function effectively in the future. Conversely, when lower levels of pollutants, particulates, and/or moisture have passed through one of the components, the more likely it will be that the respective component is healthy and is, as a result, functioning effectively and/or will function effectively in the future.

To assess the state of the one or more components, the mass and/or volume data and/or the fluid quality data may be compared with other data and/or a quality factor or threshold. The other data may, for example, include empirical data and/or expected data (e.g., expected values). The empirical data may be or include previous mass data, volume data, and/or fluid quality data (e.g., particulate data, pollutant data) associated with one or more components of the process control device 100 or another process control device. Mass, volume, and/or fluid quality data that deviate from the previous data may indicate that one or more of the components are not functioning effectively and/or being exposed to different levels of fluid, particulates, pollutants, and/or moisture than before, which may bear on the health and/or effectiveness of the one or more components. The expected data may be or include average or expected mass data, volume data, and/or fluid quality data, such as, for example, mass data, volume data, and/or fluid quality data typically expected in connection with the process control device 100. Mass, volume, and/or fluid quality data that deviate from the expected data may indicate that one or more of the components are being exposed to abnormal levels of fluid, particulates, pollutants, and/or moisture, and, thus, are not currently in good health and/or are not likely to effectively function much longer. The factor or threshold may, for example, be a maximum threshold (e.g., a maximum particulate threshold, a maximum moisture content threshold, a maximum pollutant content threshold, etc.) that the aggregated data is not to exceed. When, for example, the total particulate data indicates that the diaphragm 142 is being exposed to an amount of particulates in excess of the maximum particulate threshold, it can be determined that the one or more components may need to be soon replaced.

The state of the one or more components may be assessed in terms of a number (e.g., a number between 0 and 10), a grade (e.g., an A), a percentage (e.g., 50% healthy/effective), or some other scale. In one example, the state may be assessed in terms of a number between 0 and 10, with 0 meaning that the component is no longer healthy/effective and 10 meaning that the component is perfectly healthy/effective.

In some embodiments, the above-described diagnostic and/or prognostic techniques may be performed by the processor 202. In other embodiments, the process controller 11 or some other component of the process control system 10, rather than the processor 202, may perform the techniques. In yet another embodiment, the processor 202 may provide the analyzed data and provide the capability to perform the diagnostic and/or prognostic techniques, but the techniques are actually performed by one or more users of the process control system 10 (with or without the help of the processor 202).

By monitoring data and/or analyzing changes thereto as described herein, performance issues (e.g., leaks) and/or abnormalities in the process control device 100 can be quickly identified or predicted and remedied. By assessing the state of one or more components as described herein, faulty or otherwise non-effective components can be identified and removed or repaired and the future effectiveness and/or health of components can be estimated, thereby improving the performance of the process control device 100 and, more generally, the process control system 10.

Figure 4:
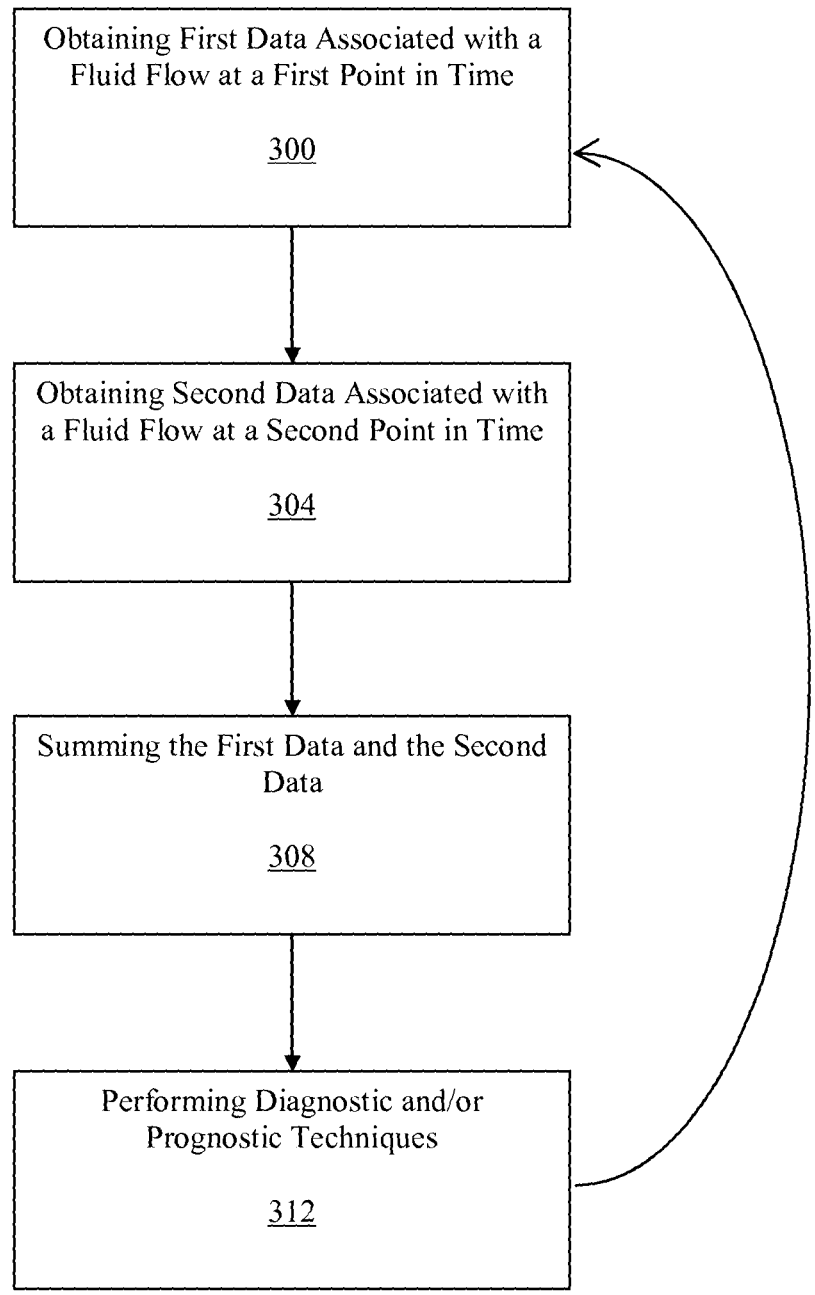
FIG. 4 is a process flow chart showing one version of a method for providing diagnostic and/or prognostic capabilities in connection with a process control system in accordance with the present disclosure.

FIG. 4 depicts an exemplary method or process for providing diagnostic and/or prognostic techniques or capabilities in connection with the process control system 10. Although the method or process is described below as being performed by the digital valve controller 105 of the process control device 100, the method or process may, alternatively, be partially or wholly performed by the process controller 11, another component or application of the process control system 10, some other component or application, or combinations thereof. The method or process is performed in the order shown and described herein, but may be implemented in or according to any number of different orders. In other embodiments, the method or process may include additional, fewer, or different acts. For example, the act of obtaining the first data (block 300), the act of obtaining the second data (block 304), and the act of aggregating or summing the first data and the second data (block 308) may be repeated any number of times. As another example, third, fourth, etc. data may be obtained and aggregated or summed with any of the other data.

The method first includes obtaining first data associated with a fluid flow through the actuator 104 or the digital valve controller 105 at a first point in time (block 300). In some embodiments, obtaining the first data may include measuring or collecting data indicative of a mass or volume through the actuator 104 or the digital valve controller 105, particularly the pneumatic relay 220 of the digital valve controller 105, at the first point in time.

The method then includes obtaining second data associated with the fluid flow through the actuator 104 or the digital valve controller 105 at a second point in time (block 304). In some embodiments, obtaining the second data may include measuring or collecting data indicative of a mass or volume through the actuator 104 or the digital valve controller 105, particularly the pneumatic relay 220 of the digital valve controller 105, at the second point in time. The second point in time is different from the first point in time. Any interval (e.g., 1 second, 30 seconds, etc.) may separate the first point in time from the second point in time.

The method further includes aggregating or summing the first data and the second data (block 308). The aggregating or summing may be accomplished with or using a summation algorithm such as, for example a Kahan algorithm, a Bresenham algorithm, a pairwise algorithm, a Fast Fourier Transform algorithm, or the like.

In some embodiments, the method further includes obtaining fluid quality data (e.g., particulate data, pollutant data, moisture content data) associated with the fluid flowing through the actuator 104 or the digital valve controller 105. The fluid quality data may be obtained (e.g., received) from a user associated with the process control device 100. The user may provide the fluid quality data locally (e.g., via the digital valve controller 105) or remotely (e.g., via a user device or workstation in communication with the digital valve controller 105). The air quality data may be measured or collected by one or more sensors (e.g., one or more sensors disposed within or coupled to the process control device 100) at one point in time or at a plurality of different points in time by one or more. In some embodiments, the air quality data may be aggregated or summed over a period of time as well. For example, the particulate data over a period of time may be aggregated, such that the total level of particulates in the fluid flowing through the actuator 104 or the digital valve controller 105 can be determined.

In turn, the method includes performing one or more diagnostic and/or prognostic techniques using or based on the aggregated data and/or the fluid quality data (which may, in some embodiments, be aggregated as well) (block 312). The diagnostic and/or prognostic techniques are generally performed in connection with one or more components of the process control device 100 that are directly exposed to or otherwise affected by fluid flowing through the process control device 100 and, thus, susceptible to damage from high masses or volumes of fluid, as well as pollutant contents, particulate contents, and moisture contents in fluid flowing through the device 100. The one or more components may, for example, include the diaphragm 142 of the actuator 104, the I/P converter of the digital valve controller 105, the pneumatic relay of the digital valve controller 105, one or more of the sensors 160, 164, 166, 168, 172, 176, other components, or combinations thereof. The diagnostic and/or prognostic techniques include, for example, monitoring the aggregated mass and/or volume data (i.e., monitoring the mass and/or volume of fluid flowing through the actuator 104 or the digital valve controller 105), monitoring the fluid quality data (i.e., monitoring the particulates, pollutant content, and/or moisture content), analyzing changes or trends in the mass data, the volume data, and/or the fluid quality data, and/or assessing a state of one or more of the components of the process control device 100.

Based on the foregoing description, it should be appreciated that the devices and methods described herein provide diagnostic and/or prognostic capabilities in connection with one or more components of a process control device that are directly exposed to or otherwise affected by fluid flow through the process control device. By providing these capabilities, performance issues, leaks, and/or other abnormalities in the process control device can be quickly identified and remedied, faulty or otherwise non-effective components can be quickly and easily identified and replaced, and the future performance of components can be estimated, thereby improving the performance of the process control system.

The invention claimed is:

1. A process control device, comprising:
   a process control valve;
   an actuator coupled to the process control valve and configured to control a position of the process control valve, the actuator comprising an actuator body coupled to the process control valve, an actuator casing coupled to the actuator body and comprising upper and lower casings, and a diaphragm secured between the upper and lower casings;
   a digital valve controller communicatively coupled to the process control valve and the actuator, the digital valve controller comprising a module base, a current to pressure converter disposed in the module base, and a pneumatic relay disposed within the module base in fluid communication with both the current to pressure converter and the actuator, wherein the digital valve controller is configured to:
      obtain first data associated with a fluid flow through the pneumatic relay of the digital valve controller at a first point in time, the first data comprising data indicative of a mass, a volume, and fluid quality of the fluid flow through the pneumatic relay at the first point in time, and
      obtain second data associated with the fluid flow through the pneumatic relay of the digital valve controller at a second point in time different from the first point in time, the second data comprising data indicative of the mass, the volume, and the fluid quality of the fluid flow through the pneumatic relay at the second point in time; and
   a processor arranged to:
      aggregate the first data and the second data, and
      perform one or more diagnostic techniques, one or more prognostic techniques, or a combination of the one or more diagnostic and the one or more prognostic techniques based on the aggregated data, the one or more diagnostic techniques, the one or more prognostic techniques, or the combination of the one or more diagnostic and the one or more prognostic techniques including assessing a physical integrity of the diaphragm based on the aggregated data, wherein the one or more diagnostic techniques, the one or more prognostic techniques, or the combination of the one or more diagnostic and the one or more prognostic techniques further include analyzing a total level of fluid mass, fluid volume, pollutants, particulates, moisture, or combinations thereof, that has flowed through the digital valve controller.

2. The process control device of claim 1, wherein the process control valve comprises a valve body and a control element, the valve body defining an outlet passage, an inlet passage, and an orifice disposed between the inlet passage and the outlet passage, and the control element comprising a valve stem and a valve plug secured to the valve stem and configured to move between an open position and a closed position, the actuator operatively coupled to the valve plug via the valve stem.

3. The process control device of claim 1, wherein the digital valve controller is further configured to obtain the fluid quality data from a user associated with the process control device, the fluid quality data comprising data indicative of a pollutant content of the fluid flow, data indicative of the particulates in the fluid flow, or data indicative of moisture content in the fluid flow.

4. The process control device of claim 1, wherein the processor is disposed within the module base of the digital valve controller.

5. The process control device of claim 1 wherein the digital valve controller is configured to aggregate the first data and the second data using a summation algorithm.

6. The process control device of claim 1, wherein the processor is arranged to compare the aggregated data with a data threshold, and wherein the processor assesses the physical integrity of the diaphragm based, at least in part, on this comparison.

7. The process control device of claim 6, wherein the data threshold comprises a maximum threshold level of particulates, a maximum threshold level of pollutants, a maximum threshold level of moisture, a maximum threshold level of fluid mass, or a maximum threshold level of fluid volume.

8. A method of providing diagnostic, prognostic, or a combination of diagnostic and prognostic techniques in connection with a process control device comprising an actuator and a digital valve controller communicatively coupled to the actuator, the actuator comprising an actuator body, an actuator casing coupled to the actuator body and comprising upper and lower casings, and a diaphragm secured between the upper and lower casings, the digital valve controller including a module base, a memory disposed within the module base, a processor disposed within the module base, logic stored on the memory, a current to pressure converter disposed within the module base, and a pneumatic relay disposed within the module base in fluid communication with both the current to pressure converter and the actuator, the method comprising:

obtaining, via the digital valve controller, first data associated with a fluid flow through the pneumatic relay of the digital valve controller at a first point in time, the first data comprising data indicative of a mass, a volume, and fluid quality of the fluid flow through the pneumatic relay at the first point in time;

obtaining, via the digital valve controller, second data associated with the fluid flow through the pneumatic relay of the digital valve controller at a second point in time, the second data comprising data indicative of a mass, a volume, and fluid quality of the fluid flow through the pneumatic relay at the second point in time;

summing, via the digital valve controller, the first data and the second data; and performing one or more diagnostic techniques, one or more prognostic techniques, or a combination of the one or more diagnostic and the one or more prognostic techniques based on the summing, the one or more diagnostic techniques, the one or more prognostic techniques, or the combination of the one or more diagnostic and the one or more prognostic techniques including assessing a physical integrity of the diaphragm based on the summing, wherein the one or more diagnostic techniques, the one or more prognostic techniques, or the combination of the one or more diagnostic and the one or more prognostic techniques further include analyzing a total level of fluid mass, fluid volume, pollutants, particulates, moisture, or combinations thereof, that has flowed through the digital valve controller.

9. The method of claim 8, wherein obtaining the first data comprises measuring the first data.

10. The method of claim 8, further comprising receiving the fluid quality data from a user associated with the process control device.

11. The method of claim 10, wherein receiving the fluid quality data comprises receiving data indicative of a pollutant content, data indicative of a particulate content, data indicative of a moisture content, or combinations thereof, in the fluid flow through the digital valve controller.

12. The method of claim 8, wherein assessing the physical integrity of the diaphragm comprises assessing a future physical integrity of the diaphragm.

13. A digital valve controller communicatively coupled to a process control device comprising a process control valve and an actuator coupled to the process control valve and configured to control a position of the process control valve, the actuator comprising an actuator body, an actuator casing coupled to the actuator body and comprising upper and lower casings, and a diaphragm secured between the upper and lower casings, the digital valve controller comprising:

a module base;
a memory disposed within the module base;
a processor disposed within the module base;
logic stored on the memory;
a current to pressure converter disposed within the module base; and
a pneumatic relay disposed within the module base in fluid communication with the current to pressure converter and the actuator, wherein the processor is configured to execute the logic to cause the processor to:

obtain first data associated with a fluid flow through the pneumatic relay of the digital valve controller at a first point in time, the first data comprising data indicative of a mass, a volume, and fluid quality of the fluid flow through the pneumatic relay at the first point in time;

obtain second data associated with the fluid flow through the pneumatic relay of the digital valve controller at a second point in time, the second data comprising data indicative of a mass, a volume, and fluid quality of the fluid flow through the pneumatic relay at the second point in time;
aggregate the first data and the second data; and
perform one or more diagnostic techniques, one or more prognostic techniques, or a combination of the one or more diagnostic and the one or more prognostic techniques based on the aggregated data, the one or more diagnostic techniques, the one or more prognostic techniques, or the combination of the one or more diagnostic and the one or more prognostic techniques including assessing a physical integrity of the diaphragm based on the aggregated data,
wherein the one or more diagnostic techniques, the one or more prognostic techniques, or the combination of the one or more diagnostic and the one or more prognostic techniques further include analyzing a total level of fluid mass, fluid volume, pollutants, particulates, moisture, or combinations thereof, that has flowed through the digital valve controller.

14. The digital valve controller of claim 13, wherein the digital valve controller is configured to obtain, from a user associated with the process control device, the fluid quality data, the fluid quality data comprising data indicative of a pollutant content, a particulate content, a moisture content, or combinations thereof, of the fluid flow through the digital valve controller.

15. The process control device of claim 3, wherein the fluid quality data comprises data indicative of the pollutant content of the fluid flow.

16. The process control device of claim 1, wherein the process control device comprises a valve body and the actuator body is coupled to the valve body, and wherein the diaphragm is operatively coupled to the valve plug via the valve stem to control movement of the valve plug between the open position and the closed position.

17. The process control device of claim 1, wherein the fluid quality data comprising data indicative of a pollutant content of the fluid flow, data indicative of particulates in the fluid flow, data indicative of moisture content in the fluid flow, or combinations thereof.

18. The method of claim 8, wherein the fluid quality data comprises data indicative of a pollutant content, data indicative of a particulate content, data indicative of a moisture content, or combinations thereof.

19. The digital valve controller of claim 13, wherein the fluid quality data comprises data indicative of a pollutant content, data indicative of a particulate content, data indicative of a moisture content, or combinations thereof.

* * * * *

UNITED STATES PATENT AND TRADEMARK OFFICE
CERTIFICATE OF CORRECTION

| | | |
|---|---|---|
| PATENT NO. | : 10,466,720 B2 | Page 1 of 1 |
| APPLICATION NO. | : 13/963590 | |
| DATED | : November 5, 2019 | |
| INVENTOR(S) | : Shawn W. Anderson | |

It is certified that error appears in the above-identified patent and that said Letters Patent is hereby corrected as shown below:

In the Specification

At Column 5, Line 6, "valve body 108" should be -- valve body 106 --.

At Column 9, Line 2, "below" should be -- below. --.

Signed and Sealed this
Eighth Day of December, 2020

Andrei Iancu
*Director of the United States Patent and Trademark Office*